United States Patent
Truong et al.

(10) Patent No.: US 9,966,836 B1
(45) Date of Patent: May 8, 2018

(54) SYSTEMS AND METHODS FOR A DUAL FUNCTION INRUSH LIMITING CIRCUIT

(71) Applicant: THE BOEING COMPANY, Chicago, IL (US)

(72) Inventors: Minh Van Truong, Huntington Beach, CA (US); Randy L. Brandt, Huntington Beach, CA (US); Suhat Limvorapun, Seal Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days. days.

(21) Appl. No.: 15/296,120

(22) Filed: Oct. 18, 2016

(51) Int. Cl.
*H02M 1/32* (2007.01)
*H02M 3/04* (2006.01)
*H02M 1/44* (2007.01)

(52) U.S. Cl.
CPC ............... *H02M 1/32* (2013.01); *H02M 1/44* (2013.01); *H02M 3/04* (2013.01)

(58) Field of Classification Search
CPC ........ H02M 1/32; H02M 3/156–3/158; H02M 3/1582; H02M 3/1588; G05F 1/52; G05F 1/607; G05F 1/612; G05F 3/04; G05F 3/12; G05F 3/18; G05F 3/265; H02H 7/24
USPC ................................................ 323/220–333
See application file for complete search history.

(56) References Cited

U.S. PATENT DOCUMENTS

| | | | | |
|---|---|---|---|---|
| 2004/0004798 | A1* | 1/2004 | Priest | H02H 9/004 361/93.1 |
| 2004/0090726 | A1* | 5/2004 | Ball | H02H 9/001 361/93.9 |
| 2005/0146314 | A1* | 7/2005 | Balakrishnan | H02M 3/157 323/285 |
| 2006/0274468 | A1 | 12/2006 | Phadke | |
| 2016/0057843 | A1* | 2/2016 | Pickett | H05B 41/282 315/200 R |

OTHER PUBLICATIONS

C.S. Smith, "Active Inrush Current Limiting Using MOSFETs", Motorola Semiconductor Application note, AN1542, Motorola, Inc. 1995, pp. 1-14.

* cited by examiner

*Primary Examiner* — Yemane Mehari
(74) *Attorney, Agent, or Firm* — Joseph M. Butscher; The Small Patent Law Group, LLC

(57) ABSTRACT

Systems and methods are provided for a dual function inrush limiting circuit (ILC). The systems and methods may include a level shift circuit (LSC). The LSC may include a Zener diode, a block diode and a capacitor. The Zener diode being in anti-series with respect to the block diode. The ILC may further include a switch electrically coupled to the LSC, an input terminal and an output terminal. The LSC may be configured to activate the switch such to electrically couple the input terminal to the output terminal. The ILC may include a direct current (DC)-DC converter electrically coupled to the output terminal. The DC-DC converter being electrically coupled to the input terminal when the switch is activated.

20 Claims, 5 Drawing Sheets

SYSTEMS AND METHODS FOR A DUAL FUNCTION INRUSH LIMITING CIRCUIT

FIELD OF THE DISCLOSURE

Embodiments of the present disclosure generally relate to systems and methods for a dual function inrush limiting circuit for a direct current (DC)-DC converter.

BACKGROUND OF THE DISCLOSURE

Inrush current is an instantaneous input current drawing by an electrical device, such as a DC-DC converter, when first turn on. Inrush limiting circuits are electrically coupled to the DC-DC converter and are used to manage power quality along shared power lines and to sustain electromagnetic interference (EMI) requirements for operation of DC-DC converters within complex electronic systems. For example, DC-DC converters typically share an input power line with other circuits that may be susceptible to damage due to spikes in voltage and/or current along the input power line. Additionally, the input circuits for the DC-DC converter may degrade if over stressed with current and/or voltage spikes output by conventional inrush limiting circuits. Conventional inrush limiting circuits typically prevent excess agitation on input power delivery ports that may damage other circuits being serviced by the same input power line. Further, conventional inrush limiting circuits typically prevent excessive current surges from stressing input EMI filter components when the DC-DC converter is powered.

However, conventional inrush limiting circuits use either a passive approach using an inductor or bypass-resistor/switch approach, or an active controlled current approach to stabilize the power line. The conventional inrush limiting circuits generally include large relays and are generally heavier and bulkier due to the large components. Further, conventional inrush limiting circuits exhibit long startup delay times that may not be acceptable for subsequent circuitry of a DC-DC converter. Additionally, DC-DC converters often require additional and separate circuitry for input voltage surges to accommodate output surges of the conventional inrush limiting circuits. Conventional systems typically require large transient voltage suppressors that add significant cost and weight to the systems.

SUMMARY OF THE DISCLOSURE

A need exists for a system and method for a dual function inrush limiting circuit that reduces an amount of components to improve reliability, while limiting the input current with a short delay time of input current to a DC-DC converter while limiting the output voltage of the inrush limiting circuit.

With this need in mind, certain embodiments of the present disclosure provide an inrush limiting circuit (ILC). The ILC may include a level shift circuit (LSC). The LSC may include a Zener diode, a block diode and a capacitor. The Zener diode being in anti-series with respect to the block diode. The ILC may further include a switch electrically coupled to the LSC, an input terminal and an output terminal. The LSC may be configured to activate the switch such that when activated the switch electrically couples the input terminal to the output terminal. The ILC may include a direct current (DC)-DC converter electrically coupled to the output terminal. The DC-DC converter being electrically coupled to the input terminal when the switch is activated.

The ILC may further include first and second resistors defining a reference voltage input, and a photovoltaic coupler configured to adjust a voltage at the output terminal when a voltage at the reference voltage input is above a predetermined threshold. Optionally, the ILC includes a shunt regulator that may be configured to electrically couple the photovoltaic coupler to ground when the reference voltage input is above the predetermined threshold. Additionally or alternatively, the ILC includes an opto-coupler electrically coupled to the LSC such that the photovoltaic coupler is configured to adjust a current delivered to the opto-coupler. Optionally, the photovoltaic coupler is configured to discharge voltage across the switch when the reference voltage input is above a predetermined threshold.

In at least one embodiment, the ILC may include an opto-coupler configured to electrically couple the LSC to the input terminal. The opto-coupler may be configured to charge the capacitor of the LSC. Additionally or alternatively, the capacitor of the LSC is configured to adjust an activation time of the switch.

Certain embodiments of the present disclosure provide a method controlling an inrush current. The method may include configuring a level shift circuit (LSC) to include a Zener diode, a block diode, and a capacitor, and electrically coupling the Zener diode to the block diode in anti-series. The method may include electrically coupling a switch to the LSC, an input terminal, and an output terminal charging the LSC. The method may include outputting a voltage from the LSC to the switch, activating the switch by the outputting, and electrically coupling the input terminal to the output terminal by the outputting. The method may include electrically coupling a direct current (DC)-DC converter to the input terminal when the switch is activated.

Optionally, the method includes adjusting a voltage at the output terminal when a reference voltage input is above a predetermined threshold. Additionally or alternatively, when the voltage at the output terminal is adjusted the voltage across the switch is discharged as well.

Certain embodiments of the present disclosure provides an inrush limiting circuit (ILC). The ILC may include a level shift circuit (LSC). The LSC having a Zener diode, a block diode and a capacitor. The Zener diode being in anti-series with respect to the block diode. The ILC may include an opto-coupler configured to electrically couple the LSC to an input terminal, and a switch electrically coupled to the LSC, the input terminal and an output terminal. The LSC may be configured to activate the switch, such that when the switch is activated the switch electrically couples the input terminal to the output terminal. The ILC may include a direct current (DC)-DC converter electrically coupled to the output terminal. The DC-DC converter being electrically coupled to the input terminal when the switch is activated. The ILC may include a photovoltaic coupler configured to adjust a voltage at the output terminal when a voltage at a reference voltage input is above a predetermined threshold.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Various embodiments of the present disclosure provide systems and methods for a dual function inrush limiting circuit. The inrush limiting circuit described herein may relate to switching power DC-DC converters using the active controlled current circuit approach and more particularly to an input level shifter in association with an input integrator that controls the rise time of the controlled inrush current source subsequent to saturation. The inrush limiter circuit may be configured to charge an input to an electromagnetic interference (EMI) filter at a rate that limits or otherwise reduces magnitudes of turn-on current surges to safe levels in order to prevent excess perturbations on input power delivery ports that may disturb and/or damage other circuits being serviced by the same input power source. The inrush limiting circuit is configured to prevent excessive current surges from stressing components of the EMI filter during the power on trajectory of the DC-DC converter. Additionally or alternatively, the inrush limiting circuit may be configured to limit the output voltage down-stream should the input supply voltage encounter temporary surge voltage.

Figure 1:
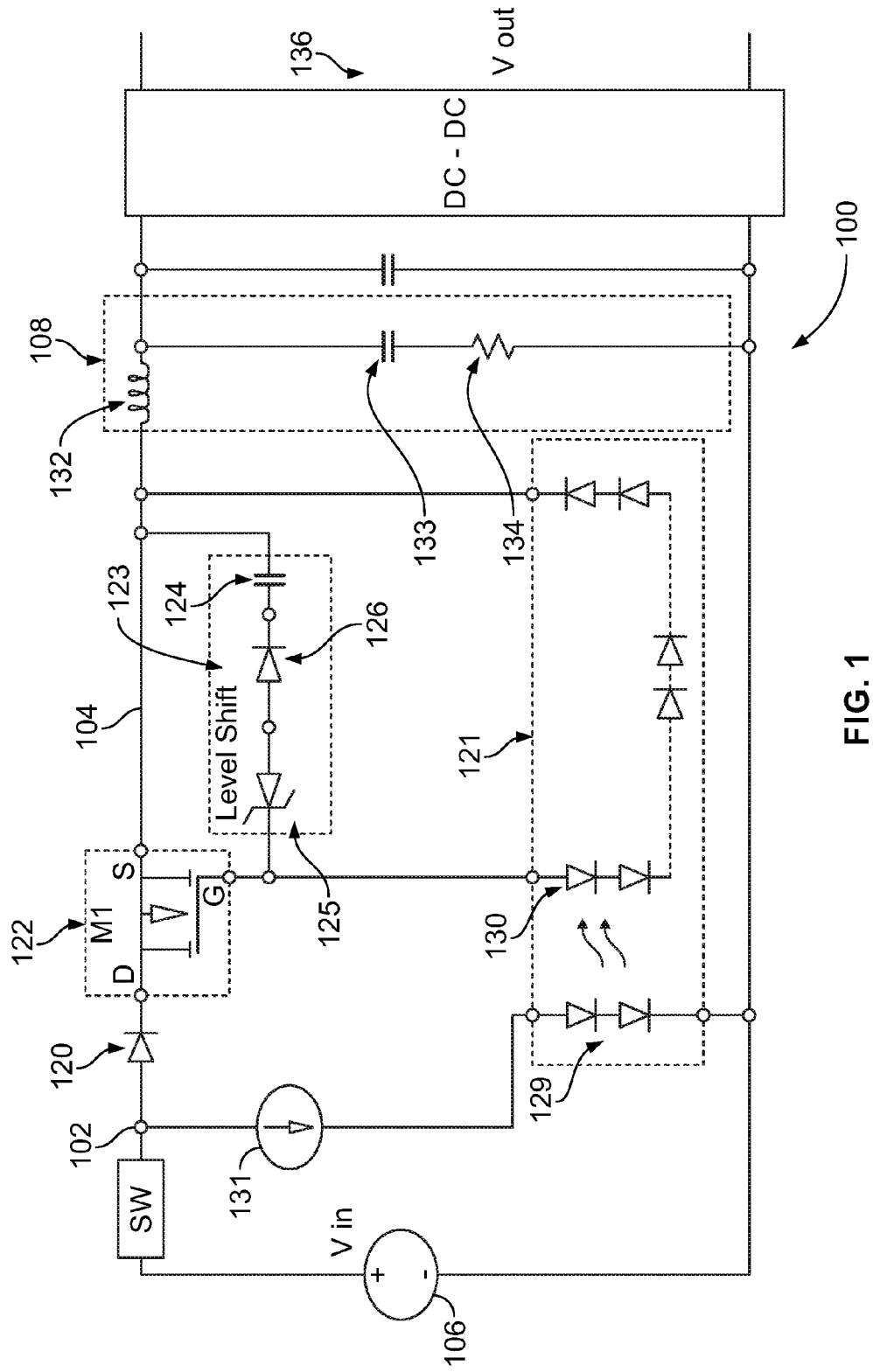
FIG. 1 illustrates a schematic diagram of an inrush limiting circuit, according to an embodiment of the present disclosure.

FIG. 1 is a schematic diagram of an inrush limiting circuit (ILC) 100, according to an embodiment of the present disclosure. The ILC 100 includes a level shift circuit (LSC) 123. The LSC 123 includes a Zener Diode 125, a block diode 126 and a capacitor 124. The Zener Diode 125 and the block diode 126 are configured in anti-series with respect to each other. For example, the Zener diode 125 and the block diode 126 are electrically coupled such that the polarities are directly opposed with respect to each other. The LSC 123 is electrically coupled to a switch 122. The switch 122 may be a solid state switch such as a metal oxide semiconductor field-effect transistor (MOSFET). The switch 122 is electrically coupled to an input terminal 102 and an output terminal 104. The input terminal 102 is provided voltage and/or current via a power source 106 representing an input power rail. Optionally, a rectifying diode 120 may be interposed between the switch 122 and the input terminal 102.

An opto-coupler 121 may be configured to electrically couple the LSC 123 to the input terminal 102. The opto-coupler 121 may include a first and second series of diodes 129 and 130 that are coupled together utilizing light. For example, current from a current source 131 flows through the first series of diodes 129. The first series of diodes 129 may be light emitting diodes that generate light based on an amount of current and/or voltage. The light traverses through an optical channel 110 and is detected by the second series of diodes 130. The second series of diodes 130 may be a plurality of photosensors, which generate current based on the detected light. The generated current flows through the second series of diodes 130, which is received by the LSC 123 and is utilized to charge the capacitor 124.

As the capacitor 124 of the LSC 123 is being charged, the block diode 126 reaches a reverse bias, which activates the switch 122. For example, during the reverse bias of the block diode 126, the Zener diode 125 increases a gate voltage of the switch 122 reaching a Miller threshold (e.g., 3.2 volts, 7 volts), thereby activating the switch 122. When the switch 122 is activated, the switch 122 is configured to electrically couple the input terminal 102 to the output terminal 104 such that current flows through the terminals 102, 104.

In at least one embodiment, the switch 122 is a solid state switch, such as a MOSFET. When the gate voltage is below 3 volts, the MOSFET is not activated (e.g., powered OFF), which prohibits current from flowing between the input and output terminals 102, 104. When the gate voltage is between 3 volts and 3.2 volts, the MOSFET reaches the Miller threshold representing a linear mode of the MOSFET and is utilized to regulate current through the input and output terminals 102, 104. When the gate voltage is above the Miller threshold, such as above 3.2 volts, the MOSFET is saturated (e.g., ON).

It is noted that an activation time of the switch 122 may be based on a value of the capacitor 124. The activation time may represent a delay time to activate the switch 122. For example, the activation time may represent a period of time to increase the voltage at the gate of the switch 122 from 0 volts to the Miller threshold (e.g., 3.2 volts) to activate the switch 122. Optionally, the activation time may represent an inrush ramp time representing an amount of time to deliver current from the input terminal 102 to the output terminal 106, which may range from 10 milliseconds to 35 milliseconds, for example.

The output terminal 104 may be electrically coupled to an electromagnetic interface (EMI) filter 108. The EMI filter 108 may include a plurality of components (e.g., inductor 132, capacitor 133, resistor 134) configured to filter out high frequency input that may cause instabilities, such as for a DC-DC converter 136. Additionally or alternatively, the output terminal 104 may be electrically coupled to the DC-DC converter 136.

Figure 2:
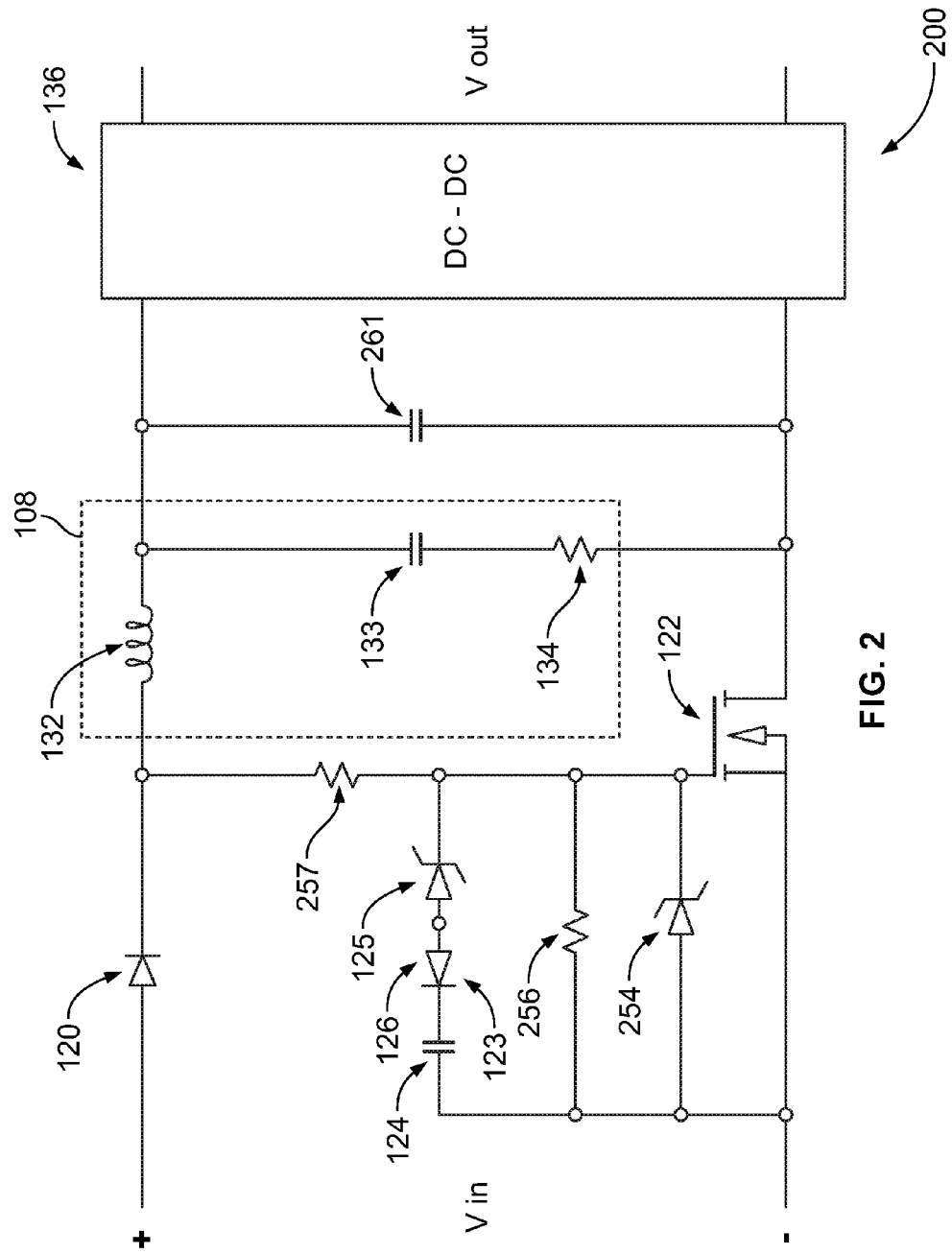
FIG. 2 illustrates a schematic diagram of an inrush limiting circuit, according to an embodiment of the present disclosure.

FIG. 2 illustrates a schematic diagram of an ILC 200, according to an embodiment of the present disclosure. A topology of the ILC 200 may be adjusted relative to the ILC 100 shown in FIG. 1. For example, the ILC 100 is positioned on a "high side" relative to the power rail, such that the LSC 123 is coupled to the output terminal 106. The ILC 200 is positioned on a "low side" or return side of the power rail.

When the voltage and/or current is received from the power rail, the capacitor 124 is charged via the resistor 257. As the capacitor 124 of the LSC 123 is being charged, the block diode 126 reaches a reverse bias. During the reverse bias of the block diode 126, the Zener diode 125 increases a gate voltage of the switch 122 reaching a Miller threshold (e.g., 3.2 volts, 7 volts). When the switch 122 is activated, the bulk capacitor 261 is grounded thereby charging the bulk capacitor 261 for the DC-DC converter 130. Optionally, the ILC 200 may include a Zener diode 254 that is configured to limit the gate voltage of the switch 122, for example at 15 volts. The resistor 256 is configured to discharge the capacitor 124 of the LSC 123 when the voltage and/or current received from the power rail is deactivated.

Figure 3:
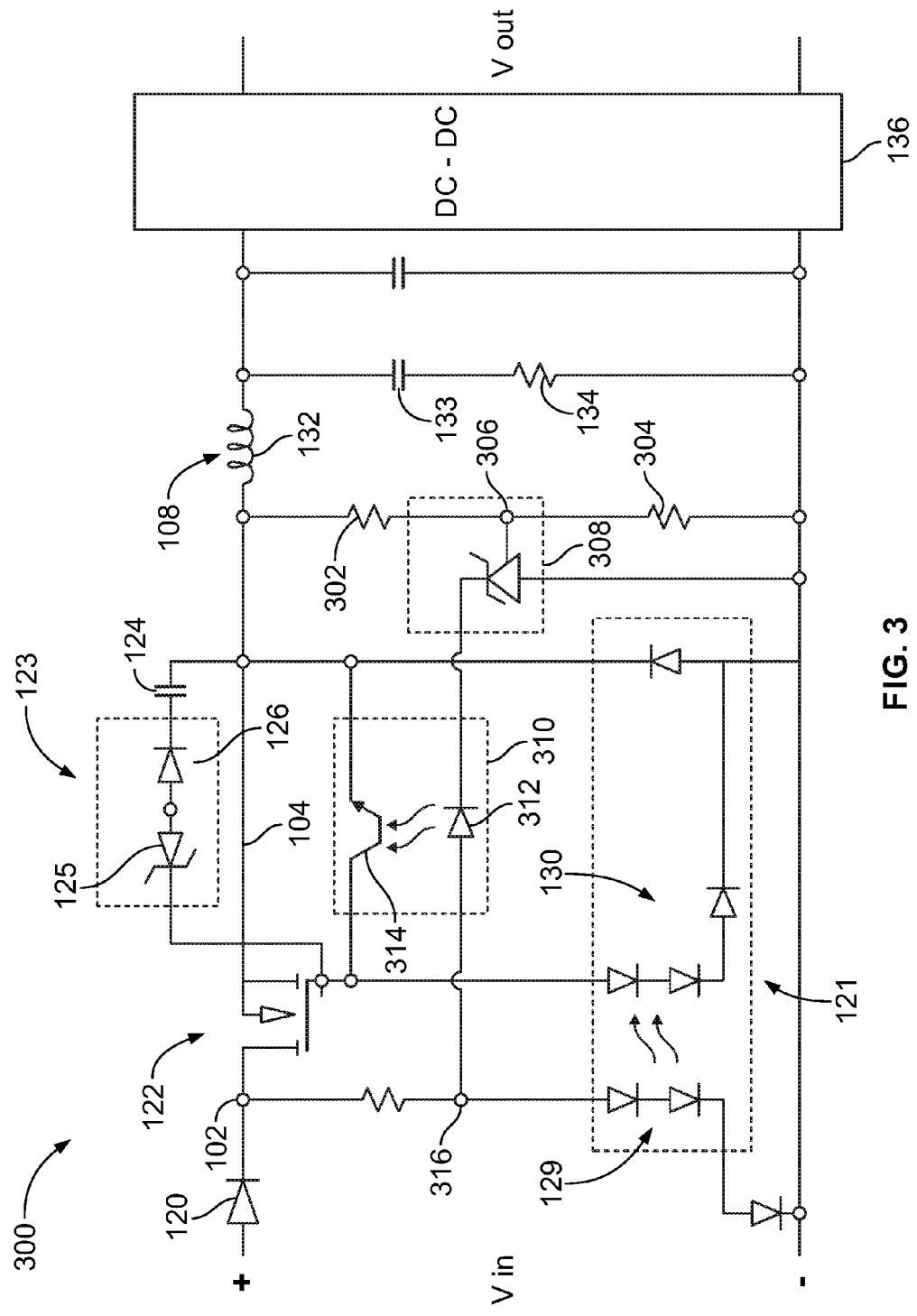
FIG. 3 illustrates a schematic diagram of an inrush limiting circuit, according to an embodiment of the present disclosure.

FIG. 3 illustrates a schematic diagram of an ILC 300, according to an embodiment of the present disclosure. The ILC 300 has a similar topology to the ILC 100 shown in FIG. 1. The ILC 300 includes a shunt regulator 308 and a photovoltaic coupler 310, which enable the ILC 300 to clamp the input voltage to the DC-DC converter 136. The shunt regulator 308 may be a Zener diode, an avalanche breakdown diode, and/or the like.

For example, similar to the ILC 100 described in FIG. 1, when voltage and/or current is delivered to the input terminal 102 the opto-coupler 121 transfers current from the first series of diodes 129 to the second series of diodes 130. The current flowing through the second series of diodes 130 charges the capacitor 124 of the LSC 123. As the capacitor 124 charges, the gate voltage of the switch 122 is increased to have the switch 122 saturated and/or activated. When the switch 122 is activated, current flows from the input terminal 102 to the output terminal 104 forming a voltage drop at a reference voltage input 306.

The reference voltage input 306 is formed by the pair of resistors 302 and 304 configured as a voltage divider. Optionally, the pair of resistors 302 and 304 define a predetermined threshold for the shunt regulator 308. The predetermined threshold is configured to represent a voltage spike (e.g., over voltage) along the output terminal 104. For example, the predetermined threshold may indicate a voltage level at the output terminal 104 that may damage secondary components electrically coupled to and/or apart of the ILC 300, such as the EMI filter 108 and/or the DC-DC converter 136. The pair of resistors 302 and 304 may be configured such that the reference voltage input at the predetermined threshold corresponds to a break down voltage of the shunt regulator 308. For example, when the reference voltage input is at the predetermined threshold, the shunt regulator 308 allows current to flow to ground.

The photovoltaic coupler 310 and/or the shunt regulator 308 are configured to adjust the voltage at the output terminal when a voltage at the reference voltage input 306 is above the predetermined threshold by clamping the voltage at the output terminal 104 to prevent damage to the secondary components. For example, when the switch 122 is activated, the shunt regulator 308 is configured to monitor and/or detect the reference voltage input 306. When the voltage at the reference voltage input 306 is above the predetermined threshold the shunt regulator is configured to electrically couple the photovoltaic coupler 310 to ground. As the photovoltaic coupler 310 is electrically coupled to ground, the photovoltaic coupler 310 is configured to discharge voltage across the switch 122 to clamp the voltage at the output terminal 104. For example, when the photovoltaic coupler 310 is electrically coupled to ground, current flows through the input diode 312 of the photovoltaic coupler 310 from the node 316 which activates the switch 314 (e.g., solid state switch, transistor, and/or the like), thereby discharging voltage across the switch 122. Based on the adjusted gate voltage of the switch 122, for example, the switch 122 may transition from a saturation state (e.g., gate voltage at 3.3 volts) to a linear region regulating output (e.g., gate voltage below 3.2 volts). As the gate voltage is adjusted (e.g., reduced) by the photovoltaic coupler 310, an amount of current flowing between the input terminal 102 and the output terminal 104 is reduced by the switch 122, thereby reducing the voltage at the output terminal 104.

Additionally or alternatively, the photovoltaic coupler 310 is configured to adjust a current delivered to the opto-coupler 121. For example, the photovoltaic coupler 310 diverts a portion of the current at node 316. As the current flows at node 316 through the photovoltaic coupler 310 an amount of current received by the first series of diodes 129 of the opto-coupler 121 is reduced relative to when the photovoltaic coupler 310 is not grounded by the shunt regulator 308. Based on the reduced current delivered to the first series of diodes 129, an amount of current delivered to the second series of diodes 130 is also reduced, which reduces the voltage at the gate of the switch 122.

As the voltage at the output terminal 104 is reduced, the voltage at the reference voltage input may fall below the predetermined threshold, which deactivates the shunt regulator 308 such that the photovoltaic coupler 310 is no longer electrically coupled to ground. As no current is flowing to the photovoltaic coupler 310 at the node 316, the amount of current received by the opto-coupler 121 is increased thereby increasing the gate voltage of the switch 122.

Figure 4:
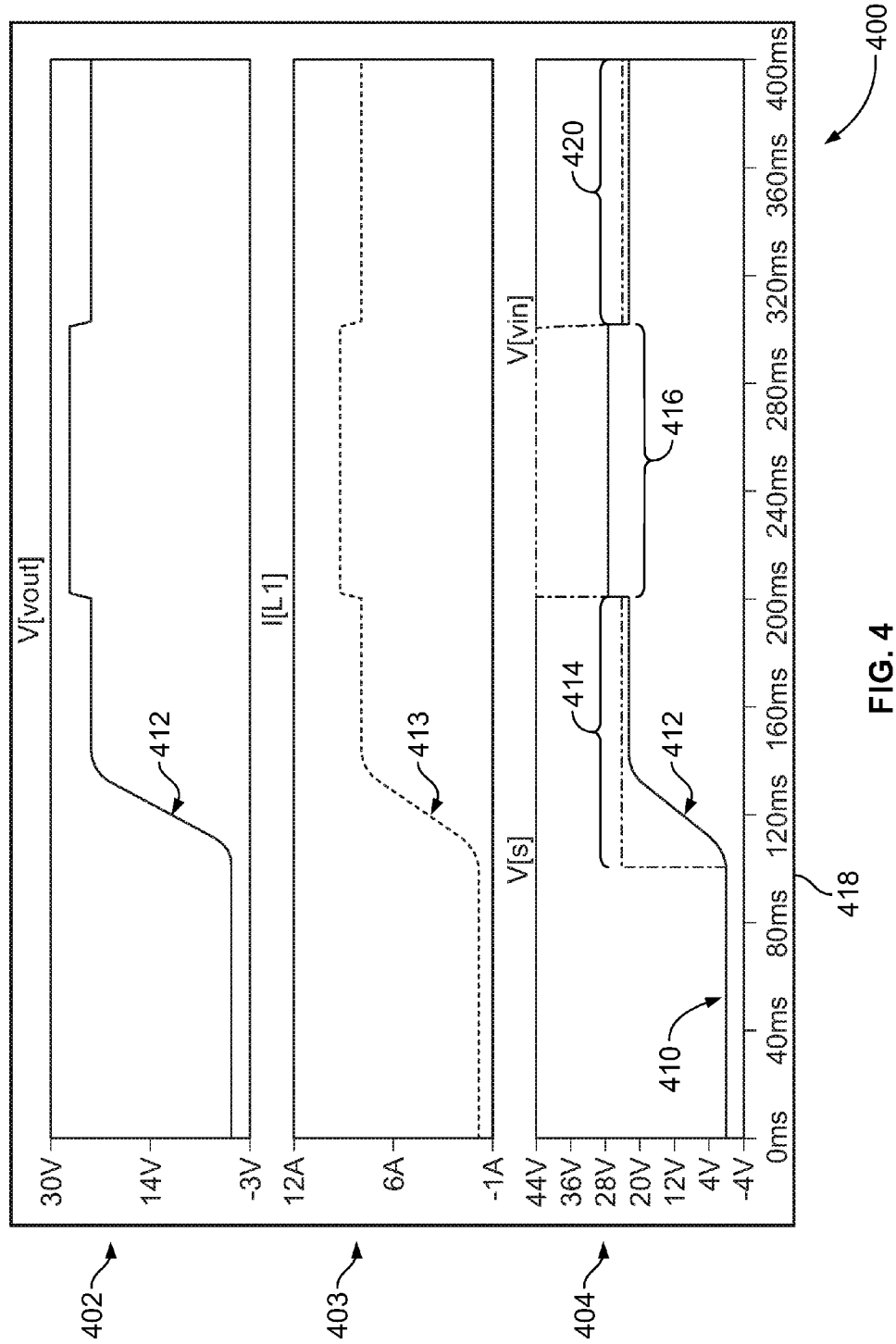
FIG. 4 illustrates graphical representations of electrical signals measured from the inrush limiting circuit shown in FIG. 3.

FIG. 4 illustrates graphical representations 402-404 of electrical signals measured from the ILC 300 shown in FIG. 3, according to an embodiment of the disclosure. The graphical representation 402 represents a voltage 412 measured at the output terminal 104. The graphical representation 403 represents a current 413 at the inductor 132 of the EMI filter 108 (e.g., current at the output terminal 104). The graphical representation 404 represents the voltages 410, 412 at the input terminal 102 and the output terminal 104, respectively. Each of the graphical representations 402-404 are plotted along a horizontal axis 400 representing time.

The voltage 410 is delivered to the input terminal 102 at 418 for time period 414. During the time period 414, the capacitor 124 of the LSC 123 is charged, thereby linearly increasing the voltage 412 of the output terminal 104. For example, the current 413 ramps up linearly (e.g., no current spikes) to approximately 7 amperes (shown in graphical representation 404) with the voltage 42 at the output terminal 104 within 35 milliseconds. It may be noted that the rise time may be adjusted (e.g., increased, decreased) by adjusting the value of the capacitor 124.

Beginning at the time period 416 (e.g., at approximately 200 milliseconds), the voltage 410 at the input terminal 102 is increased (e.g., voltage spike, voltage surge) from 24 volts to 44 volts. For example, the predetermined threshold at the reference voltage input 306 may represent a voltage of 27 volts at the output terminal 104. As described above, the photovoltaic coupler 410 and the shunt regulator 308 are activated to clamp the voltage 412 at the output terminal 104. For example, the gate voltage of the switch 122 may be continually adjusted to linearly regulate the voltage 412 and the current 413. It is noted that during the time period 420 (e.g., starting at approximately 300 milliseconds), the voltage 410 at the input terminal is adjusted back to 24 volts indicating the voltage surge has ended.

Figure 5:
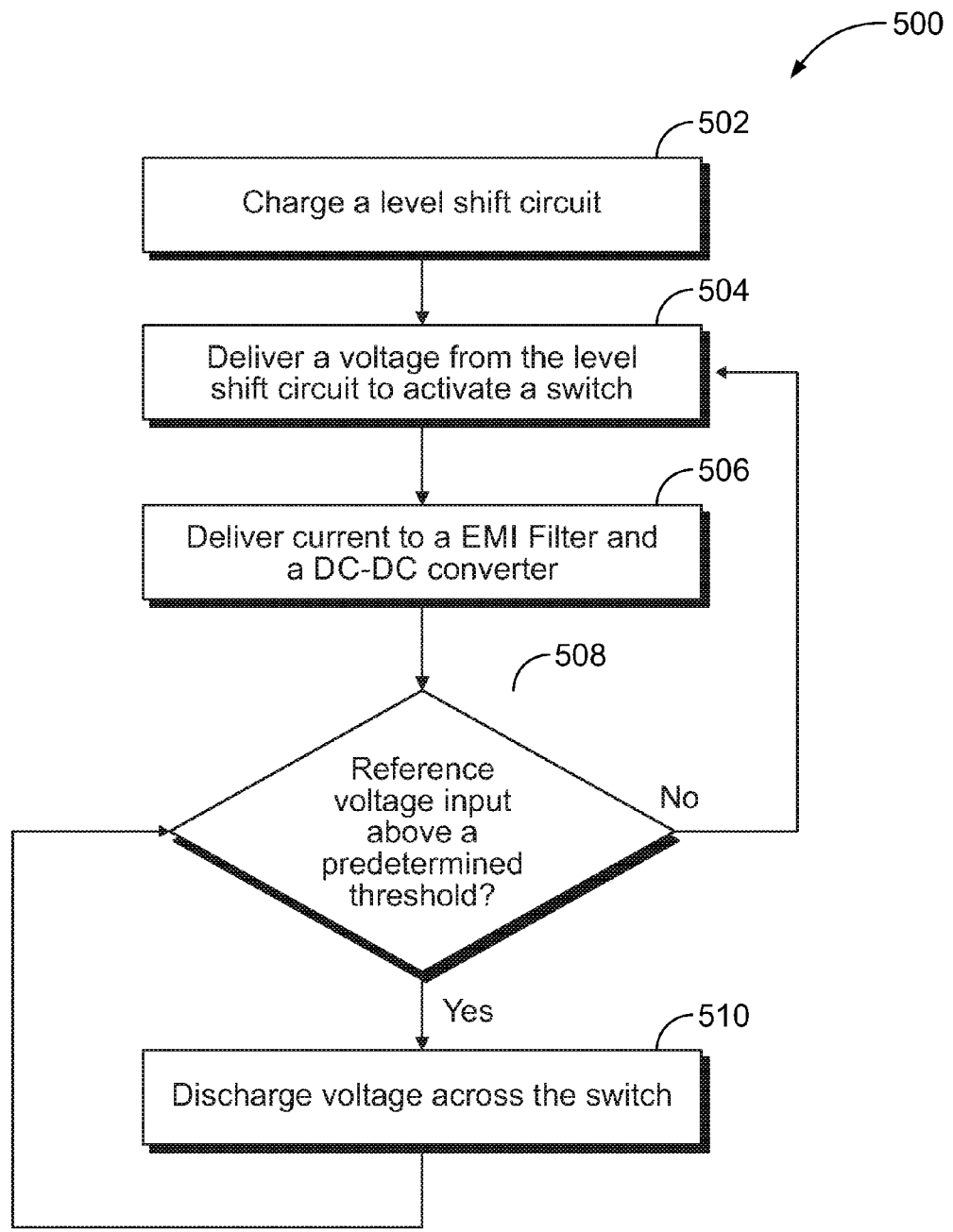
FIG. 5 illustrates a flow chart of a method of controlling an inrush current, according to an embodiment of the present disclosure.

FIG. 5 illustrates a flow chart of a method of controlling an inrush current, according to an embodiment of the present disclosure. The method 500, for example, may employ structures or aspects of various embodiments (e.g., systems and/or methods) discussed herein. For example, the ILC 300 of FIG. 3 may be configured to operate according to the flow chart shown in FIG. 5. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

Beginning at 502, the opto-coupler 121 may charge the LSC 123. For example, the input terminal 102 may receive the voltage 410 at 418 (FIG. 4) providing current to the opto-coupler 121 (FIG. 3). The current flowing through the first series of diodes 129 may be light emitting diodes that generate light based on the current from the current source 131. The light traverses through an optical channel and is detected by a photosensor, which generates current based on the detected light. The generated current flows through the second series of diodes 130, which is received by the LSC 123 and charges the capacitor 124.

At 504, the LSC 123 may deliver a voltage to activate the switch 122. For example, as the capacitor 124 of the LSC 123 is being charged, the block diode 126 reaches a reverse bias delivering current to the Zener diode 125 of the LSC 123. The Zener diode 125, electrically coupled to the switch 122 (e.g., the gate of the switch 122) increases the gate voltage of the switch 122 to reach the Miller threshold (e.g., 3.2 volts, 7 volts).

At 506, the switch 122 may deliver current to the EMI Filter 108 and the DC-DC converter 136. For example, as the gate voltage increases to the Miller threshold the switch 122 is activated. When the switch 122 is activated the input terminal 102 is electrically coupled to the output terminal 104 such that current flows through the terminals 102, 104. The current at the output terminal 104 is received by the EMI filter 108 and the DC-DC converter 136 that are electrically coupled to the output terminal 104.

At 508, the shunt regulator 308 may detect when the reference voltage input 306 is above a predetermined threshold. For example, the pair of resistors 302 and 304 may be configured such that the reference voltage input 306 reaches a breakdown voltage of the shunt regulator 308 when the predetermined threshold is reached, thereby electrically coupling the photovoltaic coupler 310 and/or the node 316 to ground.

The reference voltage input 306 is based on the pair of resistors 302 and 304. For example, the reference voltage input 306 is interposed between the pair of resistors 302 and 304. The pair of resistors 302 and 304 are configured as a voltage divider defining the reference voltage input 306. Optionally, the pair of resistors 302 and 304 define a predetermined threshold for the shunt regulator 308. The predetermined threshold is configured to indicate when a voltage spike (e.g., over voltage) is present at the output terminal 104. For example, the predetermined threshold is utilized to indicate when a voltage at the output terminal 104 may damage secondary components electrically coupled to and/or apart of the ILC 300, such as the EMI filter 108 and/or the DC-DC converter 136. The photo voltaic coupler 310 and/or the shunt regulator 308 are configured to adjust the voltage at the output terminal 104 when a voltage at the reference voltage input 306 is above the predetermined threshold to prevent damage to the to clamp the voltage at the output terminal 104 to prevent damage to the secondary components. For example, the photo voltaic coupler 310 and/or the shunt regulator 308 are configured to maintain the voltage at the output terminal 104.

If the reference voltage input 306 is above the predetermined threshold, then at 510, the photovoltaic coupler 310 may discharge voltage across the switch 122. For example, when the photovoltaic coupler 310 is electrically coupled to ground, current flows through the input diode 312 of the photovoltaic coupler 310. The voltage drop across the input diode 312 activates the switch 314 (e.g., solid state switch, transistor, and/or the like), thereby discharging voltage across the switch 122. Based on the adjusted gate voltage, for example, the switch 122 may transition from a saturation state (e.g., gate voltage at 3.3 volts) to a linear region regulating output (e.g., gate voltage below 3.2 volts). As the gate voltage is adjusted (e.g., reduced) by the photovoltaic coupler 310, an amount of current flowing between the input terminal 102 and the output terminal 104 is reduced by the switch 122 thereby reducing the voltage at the output terminal 104, a shown during the time period 416 (FIG. 4).

As described above, embodiments of the present disclosure provide systems and methods for a dual function inrush limiting circuit. Various embodiments provide a light weight, compact, and low coast approach for an inrush limiting circuit configured to limit inrush current and suppress voltage and/or current surges at an output terminal electrically coupled to a DC-DC converter and/or an EMI filter. Various embodiments provide a faster and controlled timing to activate a switch (e.g., the switch 122) and deliver current and/or voltage to the DC-DC converter.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An inrush limiting circuit (ILC) comprising:
a level shift circuit (LSC) including a Zener diode, a block diode and a capacitor, wherein the Zener diode is in anti-series with the block diode;
a switch electrically coupled to the LSC, an input terminal, and an output terminal, wherein the LSC is configured to activate the switch to electrically couple the input terminal to the output terminal; and
a direct current (DC)-DC converter electrically coupled to the output terminal, wherein the DC-DC converter is electrically coupled to the input terminal when the switch is activated.

2. The ILC of claim 1, further comprising:
first and second resistors defining a reference voltage input; and
a photovoltaic coupler configured to adjust a voltage at the output terminal when a voltage at the reference voltage input is above a predetermined threshold.

3. The ILC of claim 2, further comprising a shunt regulator, wherein the shunt regulator is configured to electrically couple the photovoltaic coupler to ground when the reference voltage input is above the predetermined threshold.

4. The ILC of claim 2, further comprising an opto-coupler electrically coupled to the LSC, wherein the photovoltaic is configured to adjust a current delivered to the opto-coupler.

5. The ILC of claim 2, wherein the photovoltaic coupler is configured to discharge voltage across the switch when the reference voltage input is above a predetermined threshold.

6. The ILC of claim 2, wherein the predetermined threshold is defined based on the first and second resistors.

7. The ILC of claim 1, further comprising an opto-coupler configured to electrically couple the LSC to the input terminal.

8. The ILC of claim 7, wherein the opto-coupler is configured to charge the capacitor of the LSC.

9. The ILC of claim 1, wherein the capacitor of the LSC is configured to adjust an activation time of the switch.

10. The ILC of claim 9, wherein the activation time is between 10 milliseconds and 35 milliseconds.

11. The ILC of claim 1, further comprising an electromagnetic interference (EMI) filter, wherein the EMI filter is electrically coupled to the output terminal.

12. The ILC of claim 1, wherein the Zener diode and the block diode are electrically coupled such that the polarities are directly opposed with respect to each other.

13. A method of controlling an inrush current, the method comprising:
configuring a level shift circuit (LSC) to include a Zener diode, a block diode, and a capacitor;
electrically coupling the Zener diode to the block diode in anti-series;
electrically coupling a switch to the LSC, an input terminal, and an output terminal charging the LSC;
outputting a voltage from the LSC to the switch;
activating the switch by the outputting from the LSC;
electrically coupling the input terminal to the output terminal by the outputting; and
electrically coupling a direct current (DC)-DC converter to the input terminal when the switch is activated.

14. The method of claim 13, further comprising adjusting a voltage at the output terminal when a reference voltage input is above a predetermined threshold wherein the adjusting operation includes discharging voltage across the switch.

15. The method of claim 14, wherein the Zener diode and the block diode are electrically coupled such that the polarities are directly opposed with respect to each other.

16. The method of claim 14, further comprising defining a predetermined threshold based on first and second resistors, electrically coupling a photo voltaic coupler to the output terminal, and adjusting a voltage at the output terminal when the voltage is above the predetermined threshold.

17. The method of claim 13, further comprising electrically coupling an opto-coupler to the LSC and the input terminal, and providing current from the input terminal to the LSC via the opto-coupler.

18. The method of claim 13, further comprising electrically coupling an electromagnetic interference (EMI) filter to the input terminal when the input terminal is electrically coupled to the output terminal.

19. The method of claim 13, wherein the capacitor of the LSC is configured to adjust an activation time of the switch during the delivering operation, the activation time being between 10 milliseconds and 35 milliseconds.

20. An inrush limiting circuit comprising:
a level shift circuit (LSC) including a Zener diode, a block diode and a capacitor, wherein the Zener diode is in anti-series with the block diode;
an opto-coupler configured to electrically couple the LSC to an input terminal;
a switch electrically coupled to the LSC, the input terminal, and an output terminal, wherein the LSC is configured to activate the switch to electrically couple the input terminal to the output terminal;
a direct current (DC)-DC converter electrically coupled to the output terminal, wherein the DC-DC converter is electrically coupled to the input terminal when the switch is activated;
a photovoltaic coupler configured to adjust a voltage at the output terminal when a voltage at a reference voltage input is above a predetermined threshold; and
first and second resistors defining the reference voltage input.

* * * * *